US008160610B2

(12) United States Patent
Harper et al.

(10) Patent No.: US 8,160,610 B2
(45) Date of Patent: Apr. 17, 2012

(54) SYSTEM AND METHOD FOR LOCATING MOBILE DEVICE IN WIRELESS COMMUNICATION NETWORK

(75) Inventors: Neil Harper, Mangerton (AU); Martin Thomson, Keiraville (AU)

(73) Assignee: Andrew LLC, Hickory, NC (US)

( * ) Notice: Subject to any disclaimer, the term of this patent is extended or adjusted under 35 U.S.C. 154(b) by 413 days.

(21) Appl. No.: 12/406,384

(22) Filed: Mar. 18, 2009

(65) Prior Publication Data

US 2010/0240389 A1     Sep. 23, 2010

(51) Int. Cl.
 *H04W 64/00*     (2009.01)
(52) U.S. Cl. ............... 455/456.1; 455/404.2; 455/456.5
(58) Field of Classification Search .... 455/404.1–404.2, 455/414.1–414.4, 440, 456.1–457
See application file for complete search history.

(56) References Cited

U.S. PATENT DOCUMENTS

| 5,999,124 | A | 12/1999 | Sheynblat |
| 6,081,229 | A | 6/2000 | Soliman et al. |
| 6,249,252 | B1 | 6/2001 | Dupray |
| 6,556,832 | B1 | 4/2003 | Soliman |
| 6,587,692 | B1 * | 7/2003 | Chen et al. ............ 455/456.1 |
| 7,084,809 | B2 | 8/2006 | Hockley, Jr. et al. |
| 7,209,077 | B2 | 4/2007 | Harper |
| 7,257,412 | B2 | 8/2007 | Chen et al. |
| 7,499,712 | B2 | 3/2009 | Riley et al. |
| 7,636,566 | B2 | 12/2009 | Karabinis |
| 7,659,850 | B1 | 2/2010 | Hou et al. |
| 2003/0004640 | A1 | 1/2003 | Vayanos |
| 2004/0174297 | A1 | 9/2004 | Cho |
| 2005/0136945 | A1 | 6/2005 | Kennedy et al. |
| 2005/0148346 | A1 | 7/2005 | Maloney et al. |
| 2005/0192024 | A1 | 9/2005 | Sheynblat |
| 2005/0206566 | A1 | 9/2005 | Stilp et al. |
| 2008/0059059 | A1 | 3/2008 | Cohen et al. |
| 2008/0074317 | A1 | 3/2008 | Harper et al. |
| 2008/0077326 | A1 * | 3/2008 | Funk et al. ............ 701/220 |
| 2008/0133126 | A1 | 6/2008 | Dupray |
| 2008/0191935 | A1 * | 8/2008 | Tidwell ............ 342/357.02 |
| 2008/0248811 | A1 | 10/2008 | Maloney et al. |
| 2008/0261614 | A1 | 10/2008 | Mia et al. |

FOREIGN PATENT DOCUMENTS

EP    1 986 017 A2    10/2008
WO    2008/036676 A2    3/2008

OTHER PUBLICATIONS

Office Action dated Feb. 2, 2011 in U.S. Appl. No. 12/406,378.
Final Office Action dated May 10, 2011 in U.S. Appl. No. 12/406,378.
Related to co-pending U.S. Appl. No. 12/406,378.

* cited by examiner

*Primary Examiner* — Ajit Patel
*Assistant Examiner* — Erica Navar
(74) *Attorney, Agent, or Firm* — Volentine & Whitt, PLLC

(57) ABSTRACT

A method is provided for determining a location of a mobile device in a wireless network. The method includes receiving global navigation satellite system (GNSS) measurements from the mobile device, and receiving terrestrial measurements from corresponding transceivers in the wireless network, each terrestrial measurement indicating a distance between the corresponding transceivers and the mobile device. The method further includes selecting at least one terrestrial measurement having an uncertainty value within a predetermined accuracy threshold. The location of the mobile device is determined as a function of the GNSS measurements and the selected terrestrial measurement.

20 Claims, 9 Drawing Sheets

SYSTEM AND METHOD FOR LOCATING MOBILE DEVICE IN WIRELESS COMMUNICATION NETWORK

BACKGROUND AND SUMMARY

A wireless communication network typically includes multiple cells having corresponding base stations for exchanging communications with mobile device operating within the cell. The base stations are connected to a centralized system, such as a mobile location center (MLC), for coordinating the communications and interfacing with other networks, such as the public switched telephone network (PSTN) and/or a packet switching network, such as the Internet.

A variety of modern wireless communication services include the feature of determining a geographic location of a mobile device. For example, an emergency service responsive to "911" being initiated at the mobile device includes estimating latitude and longitude of the mobile device in order to locate the device, which is particularly important when a distressed caller is otherwise unable to provide their present location. The geographic location of the mobile device may be determined by a server or other node in the wireless communication network, such as an MLC or a location information server (LIS). The MLC, for example, may determine the geographic location of a mobile device operating within the wireless communication network using positioning measurements from a global navigation satellite system (GNSS) or measurements from a terrestrial positioning system.

Location determinations based on GNSS measurements are generally more accurate than terrestrial measurements, although there are exceptions. For example, GNSS positioning may not be effective in urban environments or indoors, where structures obscure access to multiple satellites, weaken signal strengths, or introduce multi-path components to the signals. Therefore, conventional systems for determining geographic locations of mobile devices typically rely on GNSS measurements, and resort to terrestrial measurements only when GNSS measurements are not available or fail to provide reliable results. Conventional systems may also combine GNSS and terrestrial measurements by requesting and using them in a linear fashion. This approach is time-consuming, and does not necessarily result in the most accurate geographic location determination.

In a representative embodiment, a method is provided for determining a location of a mobile device in a wireless network. The method includes receiving global navigation satellite system (GNSS) measurements for the mobile device, and receiving terrestrial measurements from corresponding transceivers in the wireless network, each terrestrial measurement indicating a distance between the corresponding transceiver and the mobile device. The method further includes selecting at least one terrestrial measurement having an uncertainty value within a predetermined accuracy threshold. The location of the mobile device is determined as a function of the GNSS measurements and the at least one selected terrestrial measurement.

In a representative embodiment, a method is provided for determining a location of a mobile device in a wireless network. The method includes receiving GNSS measurements for the mobile device, and receiving terrestrial measurements from corresponding transceivers in the wireless network, each terrestrial measurement indicating a distance between the corresponding transceiver and the mobile device. The method further includes determining a first dilution of precision (DOP) measure corresponding to the received GNSS measurements, and determining a revised DOP measure corresponding to each terrestrial measurement combined with the GNSS measurements. At least one terrestrial measurement is selected as a function of the corresponding revised DOP measure, and the location of the mobile device is determined as a function of the GNSS measurements and the selected at least one terrestrial measurement.

In a representative embodiment, a method is provided for determining a location of a mobile device in a wireless network. The method includes providing an initial location estimate for the mobile device, the initial location estimate having a corresponding initial uncertainty area, and calculating a minimum range and a maximum range between a transceiver in the wireless network and the mobile device as a function of a given location of the transceiver and the uncertainty area of the initial location. The method further includes receiving GNSS measurements for the mobile device and receiving a terrestrial measurement from the transceiver indicating a distance between the transceiver and the mobile device. The terrestrial measurement is accepted when the terrestrial measurement is between the minimum range and the maximum range. The location of the mobile device is determined as a function of the GNSS measurements and the terrestrial measurement when the terrestrial measurement is accepted.

In a representative embodiment, a method is provided for determining a location of a mobile device in a wireless network. The method includes receiving GNSS measurements for the mobile device and calculating a first location of the mobile device and a first error ellipse at a predetermined confidence level as a function of the GNSS measurements. The method further includes receiving terrestrial measurements from transceivers in the wireless network, each terrestrial measurement indicating a distance between the respective transceiver and the mobile device, and calculating second locations of the mobile device and second error ellipses at the predetermined confidence level as a function of the GNSS measurements and multiple combinations of the terrestrial measurements. The first error ellipse is compared with each of the second error ellipses. The location of the mobile device is determined as either the first location or one of the second locations as a function of the comparison of the first and second error ellipses.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

In various embodiments, the geographic location of a mobile device is efficiently determined based on location measurements acquired and processed over the same period of time from multiple positioning systems, such as a global navigation satellite system (GNSS) and a terrestrially-based range measurement system. For example, in a representative embodiment, separate GNSS and terrestrial measurements are acquired and substantially simultaneously. The terrestrial measurements are selectively combined with the GNSS measurements only when the aggregate measurements enhance the accuracy of a hybrid location calculation. For example, terrestrial measurements may be included in the hybrid location calculation if they meet a predetermined uncertainty threshold, improve dilution of precision (DOP) of the calculation compared with using GNSS measurements alone, fall within a initial uncertainty area and/or reduce overall uncertainty.

Figure 1:
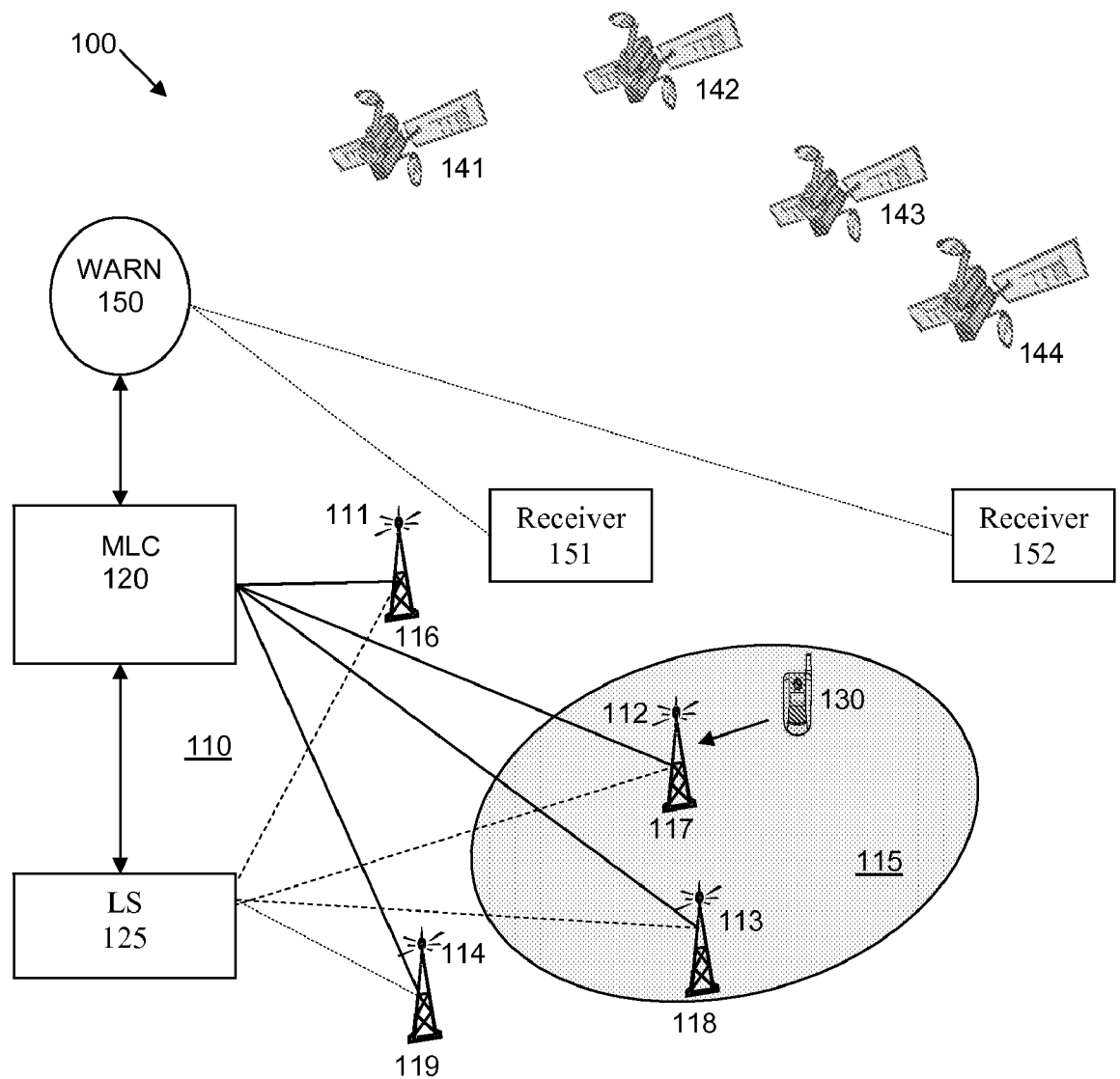
FIG. 1 is a functional block diagram illustrating a system for locating a mobile device in a wireless communication network, according to a representative embodiment.

FIG. 1 is a functional block diagram illustrating a system for locating a mobile device in a wireless communication network, according to a representative embodiment. In particular, the embodiment of FIG. 1 shows system 100, which includes wireless communication network 110 and GNSS network 140.

The wireless communication network 110 includes representative cell towers or base stations 111-114, mobile location center (MLC) 120 and location server (LS) 125. An alternative embodiment may include an LIS or other system in place of the MLC 120, for example. Each base station 111-114 is associated with a corresponding coverage area or "cell," although only cell 115 associated with base station 112 is depicted for purposes of explanation, since FIG. 1 depicts base station 112 as the base station serving representative mobile device 130 at its present location. The mobile device 130 may be any type of wireless device configured for communicating over the wireless communication network 110, including a cellular telephone, a laptop computer, a personal computer, a personal digital assistant (PDA), a gaming device, or the like. The wireless communication network 110 is configured to enable wireless communications between the mobile device 130 and the base stations 111-114 in compliance with various wireless communications standards, including, but not limited to, Universal Mobile Telecommunications System (UMTS) network, Global System for Mobile communications (GSM) network, code division multiple access (CDMA), IEEE 802.11 (WiFi), IEEE 802.16 (WiMax), digital television (DTV) network, and the like.

In an embodiment, the MLC 120 and the LS 125 are configured to determine geographic locations of mobile devices in the wireless communication network 110, including the representative mobile device 130. For example, the MLC 120 may receive a message from the mobile device 130 through the base station 112 requesting determination of the geographic location of the mobile device 130. The message may be transmitted over voice/data communication channels and/or signaling channels of the wireless communication network 110, for example. In response, the MLC 120 forwards a corresponding request to the LS 125, which retrieves measurements from location measurement units (LMUs) 116-119 of a terrestrial positioning system for determining the geographic location of the mobile device 130. In various embodiments, the terrestrial positioning system may be any system configured to determine the location of a mobile device using terrestrial measurements as input to the position calculation, which may include a trilateration technique. The terrestrial measurements may be any type of range measurements, including cellular network measurements, such as uplink-time difference of arrival (U-TDOA) or timing advance (TA) measurements (e.g., in a GSM network), round-trip time (RTT) measurements (e.g., in a UMTS network), enhanced observed time difference (E-OTD) measurements, angle of arrival (AoA) measurements, power of arrival (POA) measurements, WiFi measurements, DTV signals and the like. In addition, although one terrestrial positioning system is shown in FIG. 1, it is understood that multiple terrestrial positioning systems may be included in various configurations, without departing from the scope of the disclosure.

LMUs 116-119, depicted in FIG. 1 for purposes of discussion, are typically associated with U-TDOA systems, in which case the LS 125 is implemented as a U-TDOA location services (ULS) server and receives the U-TDOA measurements from the LMUs 116-119. In other embodiments, the MLC 120 receives the terrestrial measurements directly from the LMUs 116-119, such as embodiments using RTT measurements. The LMUs 116-119 are positioned throughout the wireless communication network 110. Also, for purposes of discussion, the LMUs 116-119 are transceivers depicted as being collocated with the base stations 111-114, although it is understood that in alternative embodiments the LMUs 116-119 may be positioned at different locations, and that there may be a different number of LMUs 116-119 than base stations 111-114. The MLC 120 is then able to calculate the location of the mobile device 130 using at least the terrestrial measurements obtained by the LS 125, as discussed below. In an embodiment, the functionality of the LS 125 is implemented by the MLC 120, although the LS 125 may alternatively be a separate entity connected to the MLC 120 through an interface.

The GNSS network 140 shown in FIG. 1 includes a constellation of positioning satellites 141-144, which provide signals to the mobile device 130. The GNSS network 140 may include any satellite positioning system configured to provide geographic locations of receivers using a constellation of satellites, such as the Global Positioning System (GPS), Global Navigation Satellite System (GLONASS), Galileo and COMPASS Navigation Satellite System (BeiDou), for example. The mobile device 130 includes a corresponding mobile GNSS receiver that receives the satellite positioning signals from the positioning satellites 141-144. The mobile device 130 is thus able to provide GNSS measurements to the MLC 120 over the wireless communications network 110. The MLC 120 is then able to calculate the location of the mobile device 130 using at least the GNSS measurements, as discussed below. In an embodiment, the mobile device 130 calculates its own location based on the GNSS measurements, and sends the calculated GNSS location to the MLC 120. However, the MLC 120 typically has more processing power, and the mobile device 130 saves battery power by not performing the calculations. Also, the MLC 120 is able to perform a hybrid location calculation because it has access to other measurements that the mobile device 130 does not have access to, such as U-TDOA measurements, base station timing or ranging signals, and/or signals from other terrestrial positioning systems. In another embodiment, the MLC 120 may receive GNSS measurements indicating the location of the mobile device 130 from a source other than the mobile device 130, such as a server remotely tracking the position of mobile device 130.

In an embodiment, the GNSS network 140 also includes a wide area reference network (WARN) 150. The WARN 150 provides a network of fixed GNSS receivers, indicated by representative GNSS receivers 151 and 152, geographically spread over the coverage area of the wireless communication network 110, and a central cache. Although only two fixed GNSS receivers 151 and 152 are depicted, e.g., positioned at locations different from the locations of base stations 111-114, it is understood that in various embodiments, there may be different numbers of fixed GNSS receivers, which may be collocated with base stations 111-114 of the wireless communication network 110. The WARN 150 collects navigation messages from the fixed GNSS receivers 151 and 152 broadcast by the satellites 141-144. The navigation messages are collated and provided to the MLC 120 for caching. The MLC 120 may then use the cached navigation messages to provide assistance data to the mobile device 130 over the wireless communication network 110, as discussed below.

Figure 2:
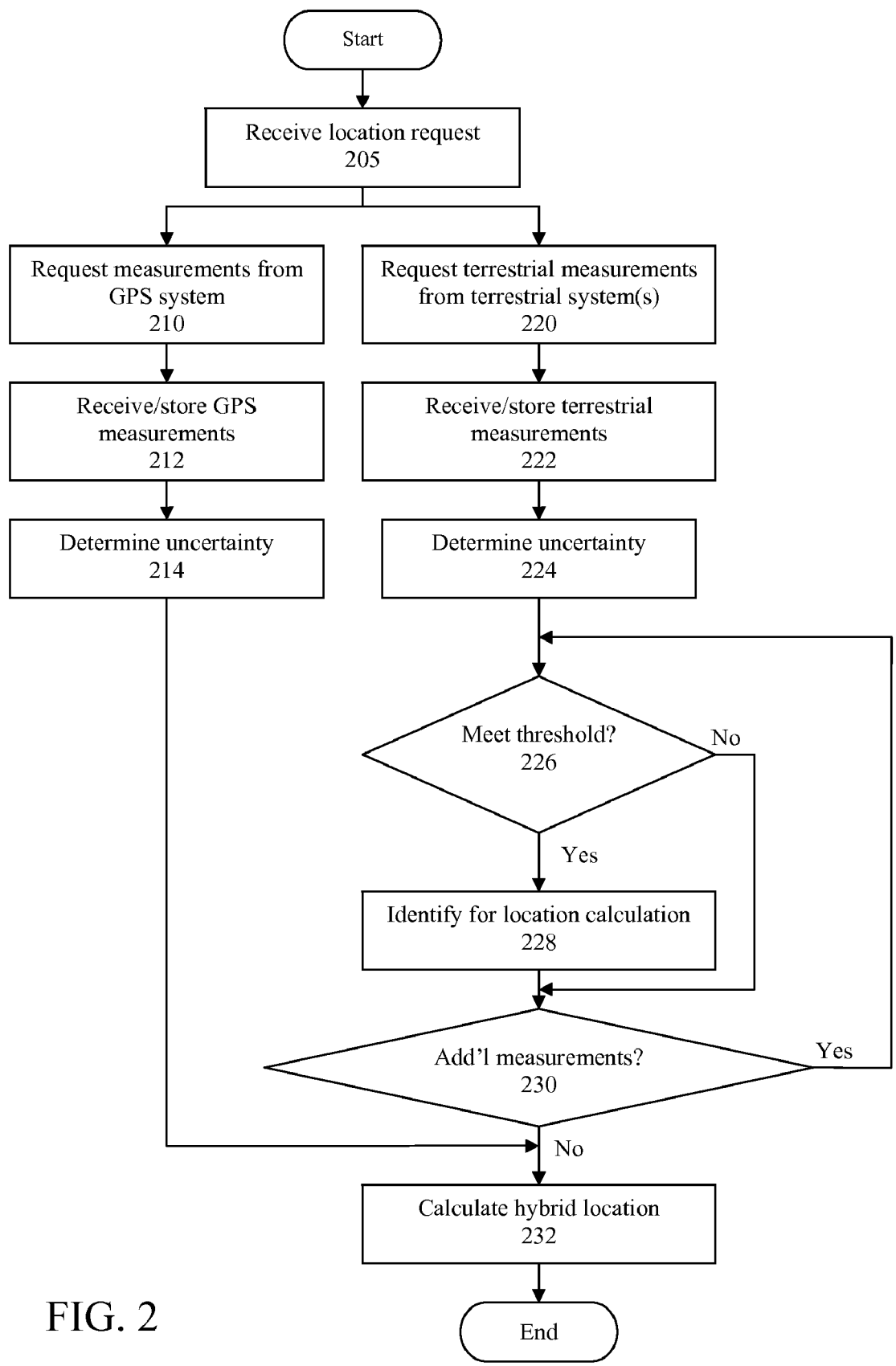
FIG. 2 is a flowchart illustrating a method for locating a mobile device in a wireless communication network, according to a representative embodiment.

FIG. 2 is a flow diagram illustrating a method for locating a mobile device in a wireless communication network, using uncertainty determinations, according to a representative embodiment.

Referring to FIG. 2, the MLC 120 receives a request at step 205 from the mobile device 130 over the wireless communication network 110 to determine the geographic location of the mobile device 130. The request may be in the form of a "911" call, for example, dialed at the mobile device 130, which automatically initiates the location determination process at the MLC 120, via messaging that is received from the network node that detects the emergency call. In addition to the "911" emergency service, the mobile device 130 may include applications specifically directed to determining current geographic location, such as subscriber location services, mapping services, and the like.

In an embodiment, the location request includes a time within which the location of the mobile device 130 is to be determined and/or a designated accuracy of the location determination, such as a quality of position (QoP) parameter, which identifies the required accuracy within a specified range (e.g., indicated as an "error ellipse" in meters). For example, the QoP parameter may indicate requisite horizontal accuracy, vertical accuracy and/or age of location with respect to the mobile device 130. When no time limit or QoP parameter is provided in the location request, the MLC 120 may provide respective default values.

At steps 210 and 220, the MLC 120 requests location measurements from devices in the wireless communication network 110 and the mobile device 130, so that the MLC 120 is able to calculate the location of the mobile device 130 using a combination of different measurement systems, such as a GNSS positioning system and one or more terrestrial positioning systems. For purposes of explanation, it is assumed that the satellite positioning system of the GNSS network 140 is a GPS system, and that the corresponding measurements are distance and/or signal transit time measurements between the mobile device 130 and each of the GPS satellites (e.g., satellites 141-144) provided by the mobile device 130. However, it is understood that other types of satellite positioning systems and corresponding measurements may be incorporated without departing from the scope of the disclosure. It is further understood that the MLC 120 may request the location measurements consecutively, concurrently or substantially concurrently without departing from the scope of the disclosure.

Likewise, for purposes of explanation, it is further assumed that the wireless communications network 110 includes one terrestrial positioning system, which may be any type of terrestrial trilateration system, as discussed above. For purposes of discussion, it is assumed that the terrestrial positioning system is a U-TDOA system, for example, and that the corresponding terrestrial measurements are time-difference measurements provided by the LMUs 116-119 based on transit time measurements of signals received from the mobile device 130. It is understood that other types of terrestrial positioning systems may likewise require incorporation of system specific devices into the wireless communication network 110, including associated hardware, software, antennae, modulators, demodulators and the like, although not specifically shown in FIG. 1. It is further understood that other types of terrestrial positioning systems and corresponding terrestrial measurements may be incorporated without departing from the scope of the disclosure.

Accordingly, in the representative embodiment, the MLC 120 requests the GPS measurements from the mobile device 130 and the terrestrial measurements from the LMUs 116-119 at steps 210 and 220, respectively. Notably, the GPS measurements are delivered together as a set to the MLC 120 by the mobile device 130, while the terrestrial measurements do not necessarily arrive at the MLC 120 from the LMUs 116-119 at the same time. Therefore, if the MLC 120 requests the GPS and terrestrial measurements at about the same time, for example, a full set of GPS measurements typically arrives before a full set of U-TDOA measurements, which may be spread over a period of time. However, depending on the circumstances, the MLC 120 may receive the full set of U-TDOA measurements first, for example, when geographical conditions make acquisition of GPS signals difficult, such as in low signal environments like urban canyons or indoors.

In an embodiment, the MLC 120 also provides satellite data to the mobile device 130 over the wireless communication network 110 to aid the mobile device 130 in more quickly locating and acquiring the satellites 141-144. For example, the mobile device 130 may be an Assisted-GPS (A-GPS) capable handset, and the MLC 120 is thus able to provide A-GPS data to the mobile device 130, along with the request to begin providing GPS measurements. The A-GPS data may include, for example, satellite acquisition assistance in order to inform the mobile device 130 for which satellites to search and where in the time and frequency domain to search. The A-GPS data may also include other assistance data types, such as orbital modeling information of the GPS satellites (e.g., satellites 141-144), including satellite ephemeris data from the GPS satellites and/or previously stored almanac data, for example.

The A-GPS data enables the mobile device 130 to locate and "lock-on" to each of the GPS satellites quickly and efficiently. The GPS assistance data may be calculated, in part, using cached navigation messages (including ephemeris data and timing signals) provided by the WARN 150, as discussed above. In an embodiment, when GPS assistance data is required, the request from the mobile device 130 includes a number or other identifier of the cell in which it is located (e.g., cell 115). The MLC 120 may then access a database (not shown) to determine the latitude, longitude, orientation, opening and/or range of the cell 115, which may be used as an initial location for calculating the GPS assistance data. For example, the MLC 120 may calculate the GPS assistance data using the latitude and longitude of the serving base station 112 and its coverage area as the approximate initial location of the mobile device 130.

In an embodiment, the GPS assistance data improves the time-to-first-fix (TTFF) and yield. For example, the orbital modeling information of the GPS assistance data enables the mobile device 130 to avoid demodulating navigation messages broadcast from the GPS satellites, thus improving TTFF. Also, the search space for locating each of the GPS satellites is narrowed by the GPS acquisition assistance, so that the mobile device 130 can detect weaker GPS signals, thus improving yield.

At steps 212 and 222, the MLC 120 receives and stores GPS measurements from the mobile device 130 and the terrestrial measurements from the LMUs 116-119, e.g., via the LS 125. Further, the MLC 120 determines the uncertainty of the GPS measurements at step 214 and the uncertainty of each of the terrestrial measurements at step 224 upon receipt from the respective systems. Notably, some measurement errors, such as troposphere and ionosphere errors, may be removed or partially removed from GPS measurements, which makes the GPS measurements more precise than uncorrected measurements. Typically, GPS measurements are more accurate than a terrestrial-based range measurement. In alternative embodiments, the uncertainties of the GPS and terrestrial measurements may be determined by the mobile device 130 and the LS 125, respectively.

With respect to the terrestrial measurements, for purposes of explanation, FIG. 2 indicates a loop in which steps 226 through 230 are repeated successively for each terrestrial measurement, each loop ending with a determination at step 230 whether additional terrestrial measurements are available for processing. However, it is understood that any or all terrestrial measurements (including terrestrial measurements from multiple terrestrial positioning systems, depending on configuration) may be processed simultaneously or substantially simultaneously, e.g., assuming that MLC 120 has sufficient processing power and that multiple terrestrial measurements have been received.

At step 226, it is determined whether the uncertainty determined in step 224, associated with each terrestrial measurement, meets a predetermined uncertainty threshold. The uncertainty threshold may be set by a user or network operator, provided by a default setting, or the like. Alternatively, the MLC 120 may set the uncertainty threshold on a case-by-case basis, depending on the uncertainty of the GPS measurements determined at step 214. For example, when the uncertainty of the GPS measurements is very low (indicating high accuracy), the uncertainty threshold may be set relatively high, so that the terrestrial measurements are largely excluded, so as not to degrade the otherwise high accuracy of the GPS measurements, unless the terrestrial measurements are also very accurate. Likewise, when the uncertainty of the GPS measurements is very high (indicating low accuracy), the uncertainty threshold may be set relatively low, so that the terrestrial measurements are more likely to be included to help boost overall accuracy.

When the uncertainty of the terrestrial measurement meets the predetermined uncertainty threshold (step 226: Yes), the terrestrial measurement is identified for inclusion in the location calculation of step 232, discussed below. For example, the terrestrial measurement may be stored separately, or memory addresses of the previously stored terrestrial measurement (e.g., stored in step 222) may be tagged accordingly. When the uncertainty of the terrestrial measurement does not meet the predetermined uncertainty threshold (step 226: No), the terrestrial measurement is not identified for inclusion in the location calculation.

In either case, the process subsequently determines at step S230 whether there are additional terrestrial measurements to be received, stored and processed, as discussed above. When it is determined that there are additional terrestrial measurements (step 230: Yes), the process returns to step 226 to compare the next terrestrial measurement to the predetermined uncertainty threshold. In an embodiment including multiple terrestrial systems, the additional terrestrial measurements may be from a terrestrial system different from the terrestrial system involved in previous processing. When it is determined that there are no further terrestrial measurements, e.g., that a full set of terrestrial measurements has been received (step 230: No), the process continues to step 232 for hybrid location calculation.

At step 232, the hybrid location calculation is performed by the MLC 120 using the set of GPS measurements and each of the terrestrial measurements meeting the predetermined threshold, as determined at step 226. The hybrid location calculation may include combining the GPS measurements and selected U-TDOA measurements in a weighted least squares process to perform the position calculation. The MLC 120 may also calculate the uncertainty associated with the calculated hybrid location.

For example, in an embodiment, a position calculation function (PCF) provided by the MLC 120 implements single point positioning (SPP), using a least squares process with a mathematical and stochastic model. With respect to the GPS measurements, the stochastic model "weights" the satellites 141-144 depending on their respective elevations above the horizon, such that satellites at higher elevations are accorded greater weights because satellites at higher elevations tend to have fewer errors, e.g., since satellites at lower elevations are subject to more ionosphere error, troposphere error and multipath effects.

The selected terrestrial measurements are integrated into the stochastic model slightly differently because the various terrestrial measurements are not subject to the clock error of the GPS receiver (e.g., in mobile device 130). That is, the terrestrial measurements provide "ranges" as opposed to the "pseudoranges" provided by the GPS measurements. The terrestrial measurements are range measurements in the form of a distance value, the uncertainty in the distance value and the coordinates of the range sources (e.g., LMUs 116-119). The uncertainties in the terrestrial measurements are used to contribute to calculation of an "error ellipse" or other area of uncertainty reported as part of the final calculated hybrid location. As with respect to the GPS measurements, the stochastic model weights the various sets of terrestrial measurements, depending on respectively perceived accuracies, e.g., identified through corresponding uncertainties determined at step 224.

Figure 3:
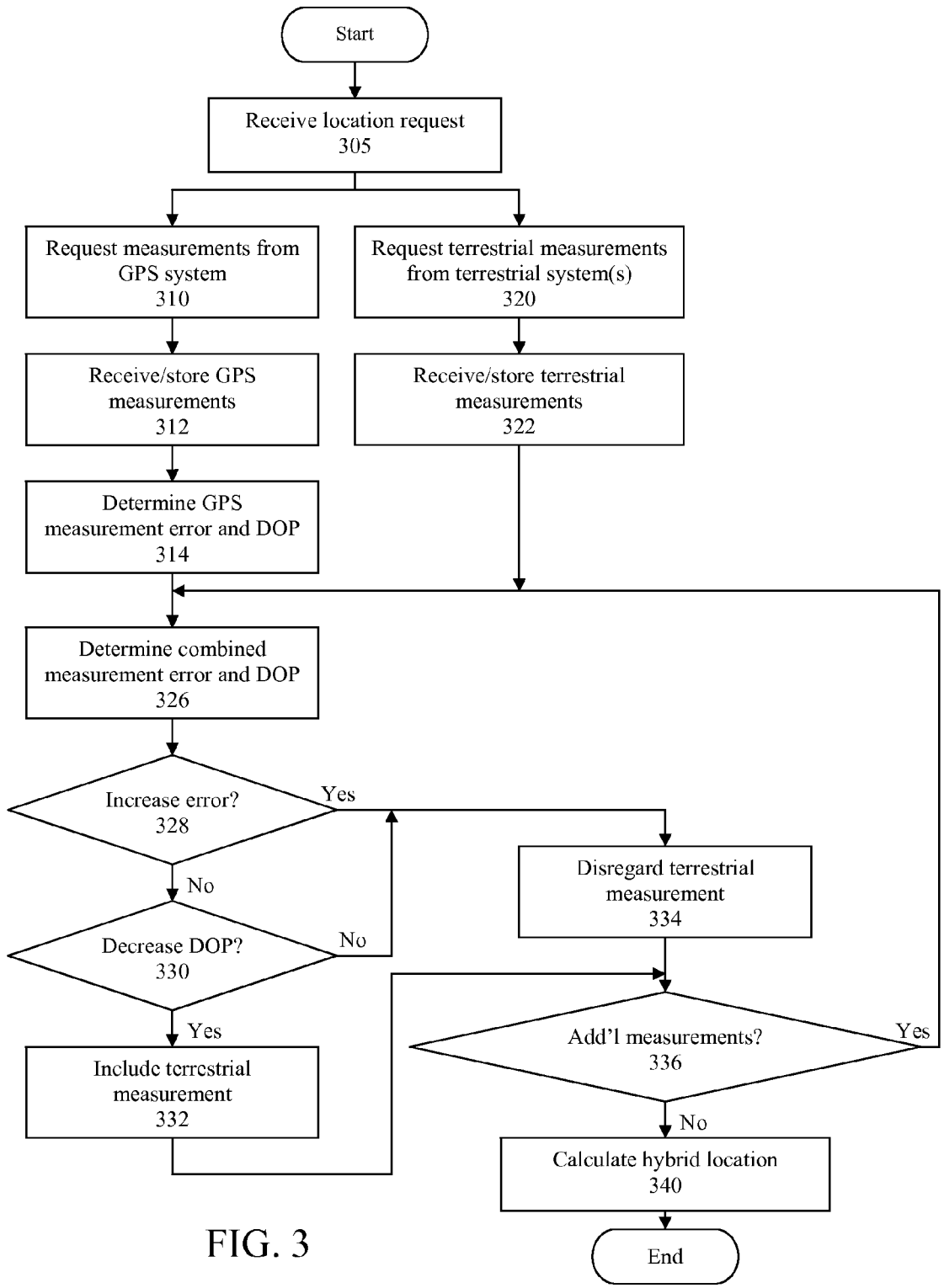
FIG. 3 is a flowchart illustrating a method for locating a mobile device in a wireless communication network, according to a representative embodiment.

FIG. 3 is a flow diagram illustrating a method for locating a mobile device in a wireless communication network, using dilution of precision (DOP) determinations, according to another representative embodiment.

Referring to FIG. 3, the MLC 120 receives a request at step 305 from the mobile device 130 over the wireless communication network 110 to determine the geographic location of the mobile device 130, as discussed above with respect to step 205. At steps 310 and 320, the MLC 120 requests location measurements from the mobile device 130 and devices in the wireless communication network 110, so that the MLC 120 is able to calculate the location of the mobile device 130 using a combination of different measurement systems, such as a GNSS positioning system and one or more terrestrial positioning systems. For purposes of explanation, it is assumed that the satellite positioning system of the GNSS network 140 is a GPS system, and that the wireless communication network 110 includes one terrestrial positioning system, which may be a U-TDOA system, for example. It is understood that other types of satellite and/or terrestrial systems may be incorporated without departing from the scope of the disclosure. It is further understood that the MLC 120 may request the location measurements consecutively, concurrently or substantially concurrently without departing from the scope of the disclosure.

Accordingly, in the representative embodiment, the MLC 120 requests the GPS measurements from the mobile device 130 and the terrestrial measurements from the LMUs 116-119 at steps 310 and 320, respectively. At steps 312 and 322, the MLC 120 receives and stores GPS measurements from the mobile device 130 and terrestrial measurements from the LMUs 116-119, e.g., via the LS 125.

The MLC 120 determines the measurement error and the DOP of the GPS measurements at step 314. Measurement error results from ionosphere error, troposphere error, multipath effects, and the like. The DOP is a measurement of the geometric spread of the measurements, for example, based on the relative positions of the satellites 141-144 with respect to the mobile device 130. Generally, with respect to a GPS system, the greater the spread among the satellites 141-144, the lower the DOP. That is, a lower DOP indicates a wider angular separation among the satellites 141-144, and thus a more accurate location calculation.

At step 326, each of the terrestrial measurements is combined with the GPS measurements, and a new measurement error and corresponding DOP are calculated. With respect to combining the terrestrial measurements, for purposes of explanation, FIG. 3 indicates a loop in which steps 326 through 336 are repeated successively for each terrestrial measurement, each loop ending with a determination at step 336 whether additional terrestrial measurement(s) are available for processing. However, it is understood that any or all terrestrial measurements alternatively may be processed simultaneously or substantially simultaneously, e.g., assuming that MLC 120 has sufficient processing power and that multiple terrestrial measurements have been received.

Generally, when the combined GPS and terrestrial measurements improve the DOP without increasing measurement error, then the resulting calculated hybrid location is more accurate. Therefore, at step 328, it is determined whether the new measurement error of the combined GPS and terrestrial measurements increases over the measurement error of only the GPS measurements determined at step 314. When the new combined measurement error has not increased (step 328: No), it is determined at step 330 whether the new DOP of the combined GPS and terrestrial measurements decreases (improves) over the DOP of only the GPS measurements determined in step 314. When the new combined DOP has decreased (step 330: Yes), the corresponding terrestrial measurement is included with the GPS measurements for subsequent calculation of the hybrid location (e.g., at step 340), discussed below.

It is understood that the order of determining whether the terrestrial measurement increases measurement error and/or decreases DOP may vary, or the determinations may be performed simultaneously, without departing from the scope of the disclosure. When either the new combined measurement error is increased over the GPS measurements error (step 328: Yes) or the new combined DOP is increased over the GPS measurements DOP, the terrestrial measurement is disregarded at step 334.

The process determines at step 336 whether there are additional terrestrial measurements to be processed, as discussed above. When it is determined that there are additional terrestrial measurements (step 336: Yes), the process returns to step 326 to determine the combined measurement error and DOP of the next terrestrial measurement. In an embodiment including multiple terrestrial systems, the additional terrestrial measurement may be from a terrestrial system different from the terrestrial system involved in previous processing. When there are no additional terrestrial measurements to be obtained (step 336: No), the MLC 120 calculates the hybrid location at step 340 using the GPS measurements and the terrestrial measurements that improved the DOP without increasing measurement error, included in step 332. The hybrid location calculation is performed, for example, as discussed above with respect to step 232 of FIG. 2.

Figure 4:
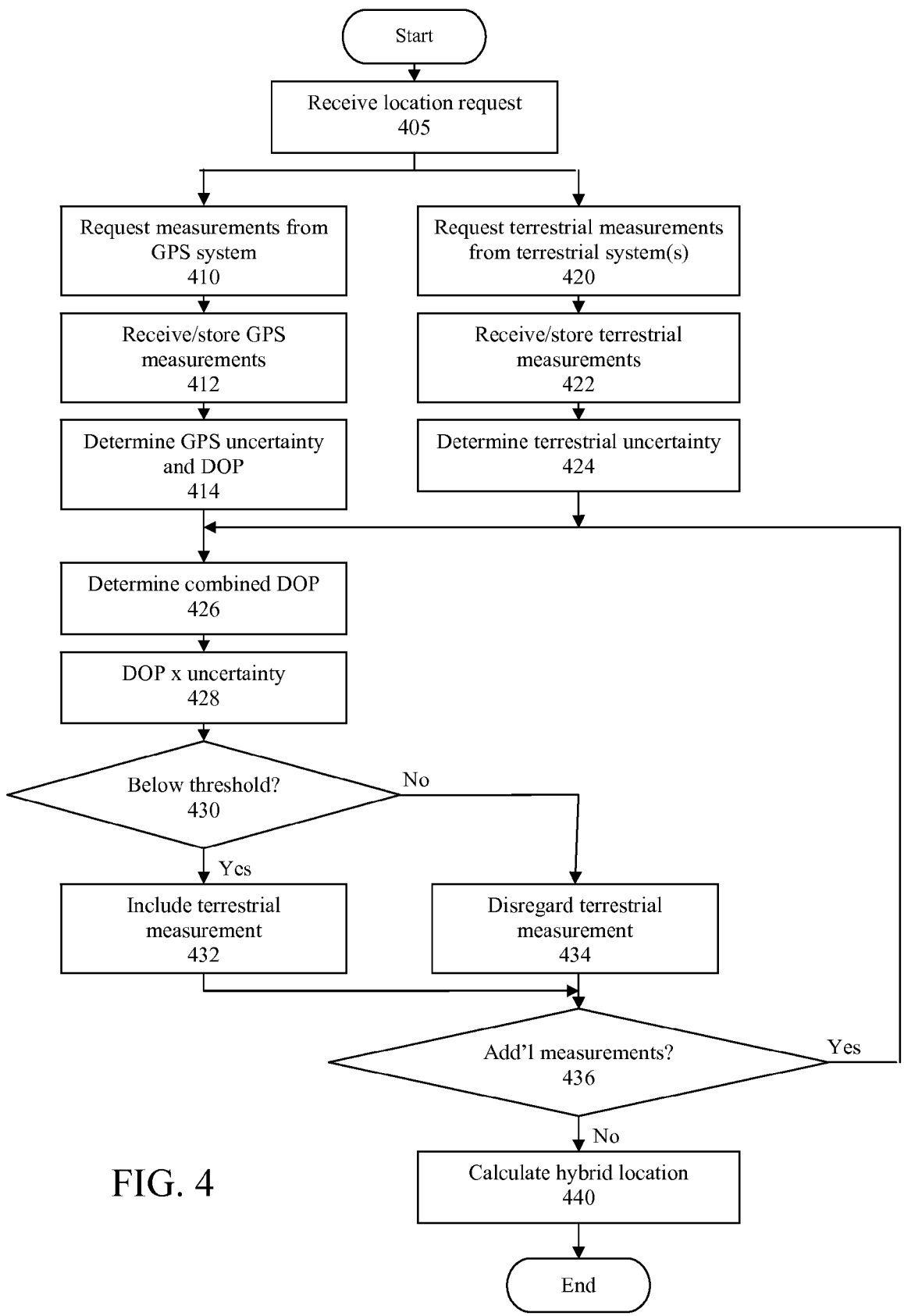
FIG. 4 is a flowchart illustrating a method for locating a mobile device in a wireless communication network, according to a representative embodiment.

FIG. 4 is a flow diagram illustrating a method for locating a mobile device in a wireless communication network, effectively combining the processes depicted in FIGS. 2 and 3, so that terrestrial measurements are selected based on their corresponding uncertainties, as well as the effect of each terrestrial measurement on the DOP when combined with the GPS measurements.

Referring to FIG. 4, the MLC 120 receives a request at step 405 from the mobile device 130 over the wireless communication network 110 to determine the geographic location of the mobile device 130, as discussed above with respect to step 205. At steps 410 and 420, the MLC 120 requests location measurements from the mobile device 130 and devices in the wireless communication network 110, so that the MLC 120 is able to calculate the location of the mobile device 130 using a combination of different measurement systems, such as a GNSS positioning system and one or more terrestrial positioning systems. For purposes of explanation, it is assumed that the satellite positioning system of the GNSS network 140 is a GPS system, and that the wireless communication network 110 includes one terrestrial positioning system, which may be a U-TDOA system, for example. It is understood that other types of satellite and/or terrestrial systems may be incorporated without departing from the scope of the disclosure. It is further understood that the MLC 120 may request the location measurements consecutively, concurrently or substantially concurrently without departing from the scope of the disclosure.

Accordingly, in the representative embodiment, the MLC 120 requests the GPS measurements from the mobile device 130 and the terrestrial measurements from the LMUs 116-119 at steps 410 and 420, respectively. At steps 412 and 422, the MLC 120 receives and stores GPS measurements from the mobile device 130 and terrestrial measurements from the LMUs 116-119, e.g., via the LS 125. Further, the MLC 120 determines the uncertainty and the DOP of the GPS measurements at step 414, as discussed above with respect to step 214 of FIG. 2. Also, the MLC 120 determines the uncertainty of each terrestrial measurement at step 424, as discussed above with respect to step 224 of FIG. 2.

At step 426, each of the terrestrial measurements is combined with the GPS measurements, and a DOP is calculated. With respect to combining the terrestrial measurements, for purposes of explanation, FIG. 4 indicates a loop in which steps 426 through 436 are repeated successively for each terrestrial measurement, each loop ending with a determination at step 436 whether additional terrestrial measurement(s) are available for processing. However, it is understood that any or all terrestrial measurements may be processed simultaneously or substantially simultaneously, e.g., assuming that MLC 120 has sufficient processing power and that multiple terrestrial measurements have been received.

At step 428, the combined DOP and the uncertainty of the terrestrial measurement, determined at step 424, are multiplied to provide a product indicating whether the terrestrial measurement should be combined with GPS measurements, as a function of the terrestrial measurement's uncertainty and the effect on the DOP of combining the terrestrial measurement with the GPS measurements. The product is compared to a predetermined threshold at step 430. When the product is less than the predetermined threshold (step 430: Yes), indicating a low uncertainty of the terrestrial measurement and/or a combined DOP lower than the DOP based only on the GPS measurements, the terrestrial measurement is identified at step 432 to be included in the hybrid location calculation, discussed below with respect to step 440. When the product is greater than or equal to the predetermined threshold (step 430: No), indicating a high uncertainty of the terrestrial measurement and/or a combined DOP higher than the DOP based only on the GPS measurements, the terrestrial measurement is disregarded at step 434.

The predetermined threshold is set at a value that prevents undesirable results based on the particular factors associated with each terrestrial measurement. For example, when the uncertainty of a terrestrial measurement determined at step 424 is particularly high, the terrestrial measurement should be disregarded, even if the terrestrial measurement would otherwise decrease the DOP when combined with the GPS measurements. Likewise, when a terrestrial measurement has a low uncertainty, indicating that the terrestrial measurement is accurate, but the terrestrial measurement does not decrease the DOP when combined with the GPS measurements, the terrestrial measurement is still disregarded. Thus, a terrestrial measurement is included only when the combined uncertainty and effect of DOP provides a net improvement in the hybrid location calculation.

Referring again to FIG. 4, after determining whether to include or disregard the terrestrial measurement and step 432 or step 434, the process determines at step 436 whether there are additional terrestrial measurements to be received, stored and processed, as discussed above. When it is determined that there are additional terrestrial measurements (step 436: Yes), the process returns to step 426 to determine the combined DOP using the next terrestrial measurement. In an embodiment including multiple terrestrial systems, the additional terrestrial measurement may be from a terrestrial system different from the terrestrial system involved in previous processing. When there are no additional terrestrial measurements to be obtained (step 436: No), the MLC 120 calculates the hybrid location at step 440 using the GPS measurements and the terrestrial measurements that provided a product of uncertainty and DOP lower than the predetermined threshold. The hybrid location calculation is performed, for example, as discussed above with respect to step 232 of FIG. 2.

Figure 5:
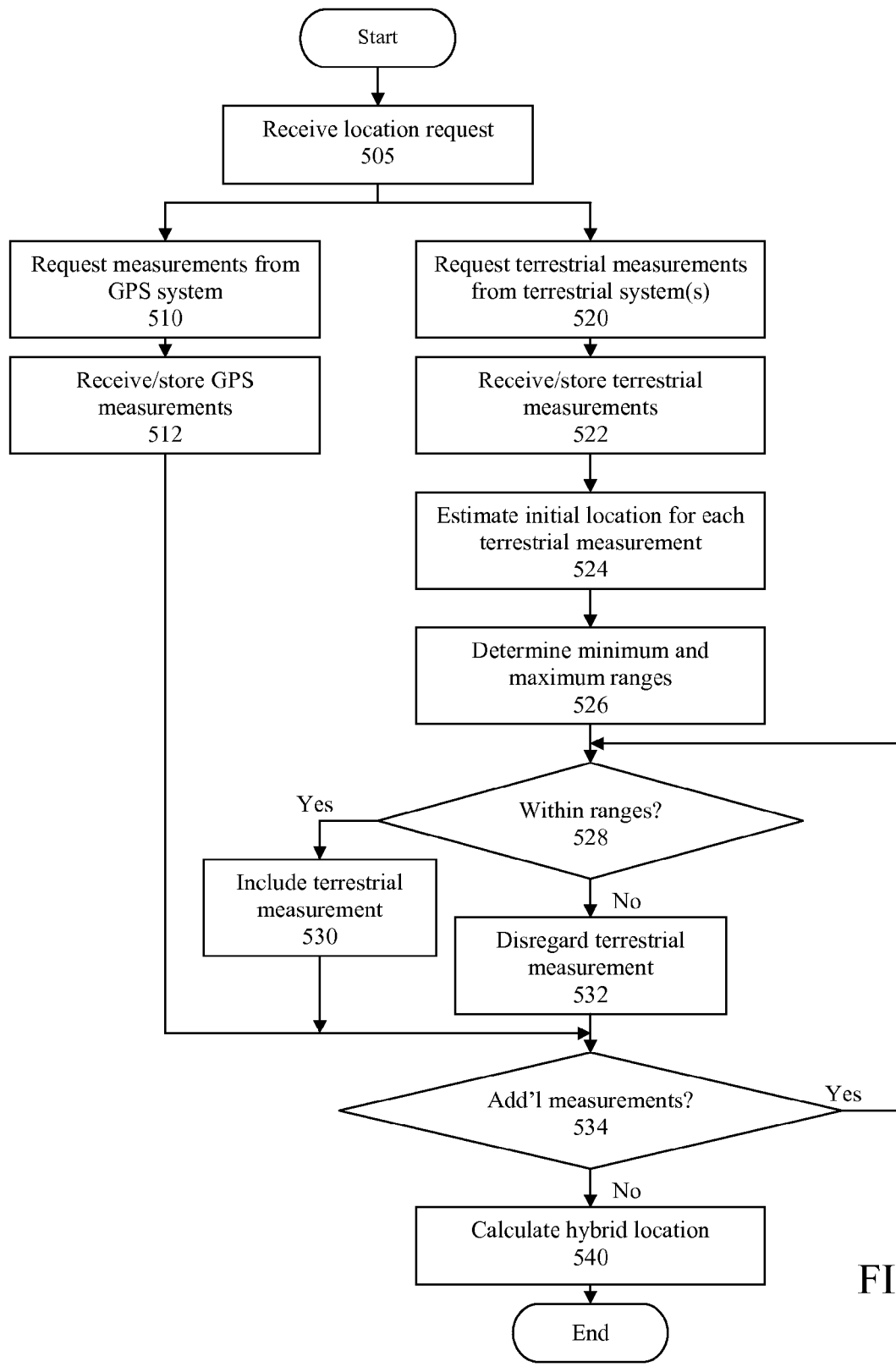
FIG. 5 is a flowchart illustrating a method for locating a mobile device in a wireless communication network, according to a representative embodiment.

FIG. 5 is a flow diagram illustrating a method for locating a mobile device in a wireless communication network, using initial location estimates of the mobile device, according to a representative embodiment.

Referring to FIG. 5, the MLC 120 receives a request at step 505 from the mobile device 130 over the wireless communication network 110 to determine the geographic location of the mobile device 130, as discussed above with respect to step 205 of FIG. 2. At steps 510 and 520, the MLC 120 requests location measurements from the mobile device 130 and devices in the wireless communication network 110, so that the MLC 120 is able to calculate the location of the mobile device 130 using a combination of different measurement systems, such as a GNSS positioning system and one or more terrestrial positioning systems. For purposes of explanation, it is assumed that the satellite positioning system of the GNSS network 140 is a GPS system, and that the wireless communication network 110 includes one terrestrial positioning system, which may be a U-TDOA system, for example. It is understood that other types of satellite and/or terrestrial systems may be incorporated without departing from the scope of the disclosure. It is further understood that the MLC 120 may request the location measurements consecutively, concurrently or substantially concurrently without departing from the scope of the disclosure.

Accordingly, in the representative embodiment, the MLC 120 requests the GPS measurements from the mobile device 130 and the terrestrial measurements from the LMUs 116-119 at steps 510 and 520, respectively. At steps 512 and 522, the MLC 120 receives and stores GPS measurements from the mobile device 130 and terrestrial measurements from the LMUs 116-119, e.g., via the LS 125.

Meanwhile, at step 524, the MLC 120 initially estimates the location of the mobile device 130, which includes an initial uncertainty area. In an embodiment, the initial location estimate of the mobile device 130 is the location of the base station currently servicing the mobile device 130 (e.g., base station 112), and the initial uncertainty area is the coverage of the corresponding cell. For example, referring to FIG. 1, the initial location estimate may be the longitude and latitude of the servicing base station 112, and the initial uncertainty area may be the area of cell 115.

Figure 6A:
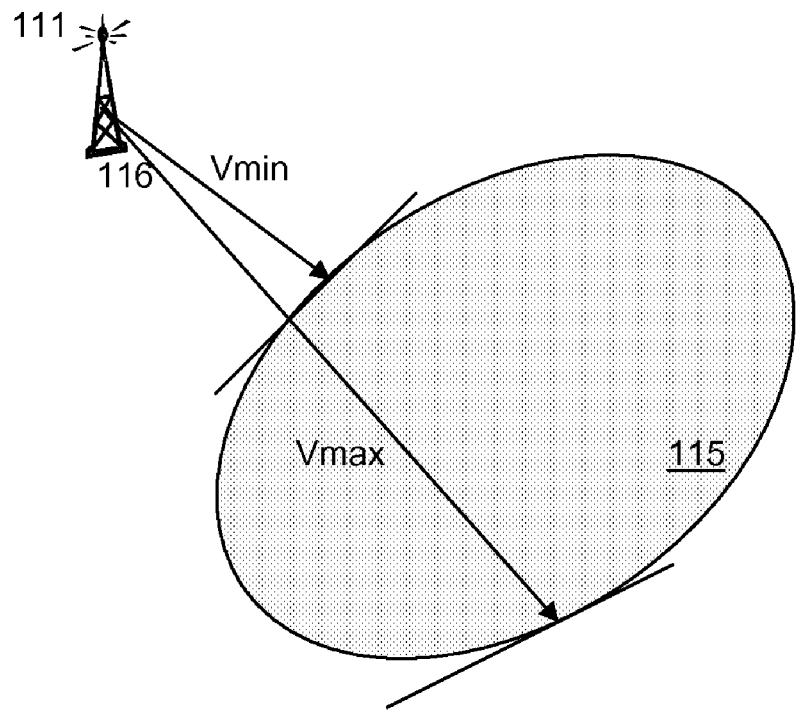
FIGS. 6a and 6b are functional block diagrams illustrating a system for locating a mobile device in a wireless communication network, according to a representative embodiment.
Figure 6B:
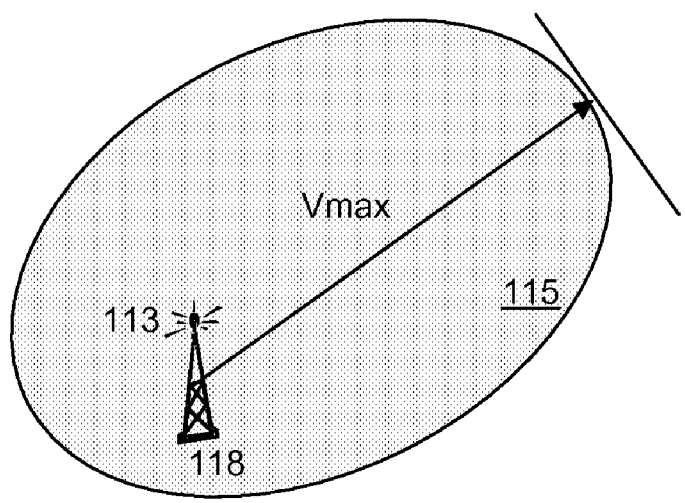

At step 526, minimum and maximum ranges from each LMU 116-119 to the mobile device are determined based on the initial uncertainty area (e.g., the area of cell 115). For example, in a cellular network (e.g., UMTS, GSM), the initial uncertainty area may be the servicing cell, or in a wireless broadband or local area network (e.g., WiFi, WiMedia), the initial uncertainty area may be the "hotspot" area corresponding to an access point. The minimum and maximum ranges are determined differently for LMUs outside the initial uncertainty area (e.g., LMUs 116 and 119) and LMUs inside the initial uncertainty area (e.g., LMUs 117 and 118). FIGS. 6a and 6b are block diagrams showing the minimum and maximum ranges with respect to LMUs 116 and 118, respectively located inside and outside the initial uncertainty area (e.g., cell 115).

Referring to FIG. 6a, depicting representative LMU 116 located outside the initial uncertainty area (e.g., cell 115), the minimum range is the distance between the LMU 116 and the closest point of the initial uncertainty area, determined as the point at which vector Vmin from the LMU 116 perpendicularly intersects a tangent of the outer periphery of the near boundary of the initial uncertainty area, for example. The maximum range is the distance between the LMU 116 and the furthest point of the initial uncertainty area, determined as the point at which vector Vmax from the LMU 116 perpendicularly intersects a tangent of the outer periphery of the far boundary of the initial uncertainty area, for example. Referring to FIG. 6*b*, depicting representative LMU 118 located inside the initial uncertainty area (e.g., cell 115), the minimum range is zero, and the maximum range is the distance between the LMU 118 and the furthest point of the initial uncertainty area, determined as the point at which vector Vmax from the LMU 118 perpendicularly intersects a tangent of the outer periphery of the far boundary of the uncertainty area, for example.

Although depicted as an ellipse, it is understood that the initial uncertainty area (e.g., cell 115) may be any other shape or area, including a circle, a sector, an arc band, a polygon or the like. It is further understood that the initial uncertainty area need not match the area of the cell in which the mobile device 130 is presently located, although the initial uncertainty area would overlap at least a portion of the cell in which the mobile device 130 is presently located.

At step 528, it is determined whether each received terrestrial measurement is within the minimum and maximum ranges determined with respect to the corresponding one of the LMUs 116-119. For purposes of explanation, FIG. 5 indicates a loop in which steps 528 through 534 are repeated successively for each terrestrial measurement, each loop ending with a determination at step 534 whether additional terrestrial measurement(s) are available for processing. However, it is understood that any or all terrestrial measurements may be processed simultaneously or substantially simultaneously. It is further understood that the MLC 120 may be receiving and storing terrestrial measurements from any or all LMUs 116-119 as it is estimating initial locations and determining minimum and maximum ranges for each of the LMUs 116-119, depicted in steps 524 and 526, respectively.

When the terrestrial measurement is within the minimum and maximum ranges (step 528: Yes), indicating a valid terrestrial measurement, the terrestrial measurement is identified at step 530 to be included in the hybrid location calculation, discussed below with respect to step 540. When the terrestrial measurement is not within the minimum and maximum ranges (step 528: No), indicating an invalid terrestrial measurement, the terrestrial measurement is disregarded at step 532.

After determining whether to include or disregard the terrestrial measurement and step 530 or step 532, the process determines at step 534 whether there are additional terrestrial measurements to be processed, as discussed above. When it is determined that there are additional terrestrial measurements (step 534: Yes), the process returns to step 528 to compare the next terrestrial measurement with the minimum and maximum ranges. In an embodiment including multiple terrestrial systems, the additional terrestrial measurement may be from a terrestrial system different from the terrestrial system involved in previous processing. When there are no additional terrestrial measurements (step 534: No), the MLC 120 calculates the hybrid location at step 540 using the GPS measurements and the valid terrestrial measurements, identified in step 530. The hybrid location calculation is performed, for example, as discussed above with respect to step 232 of FIG. 2.

Figure 7:
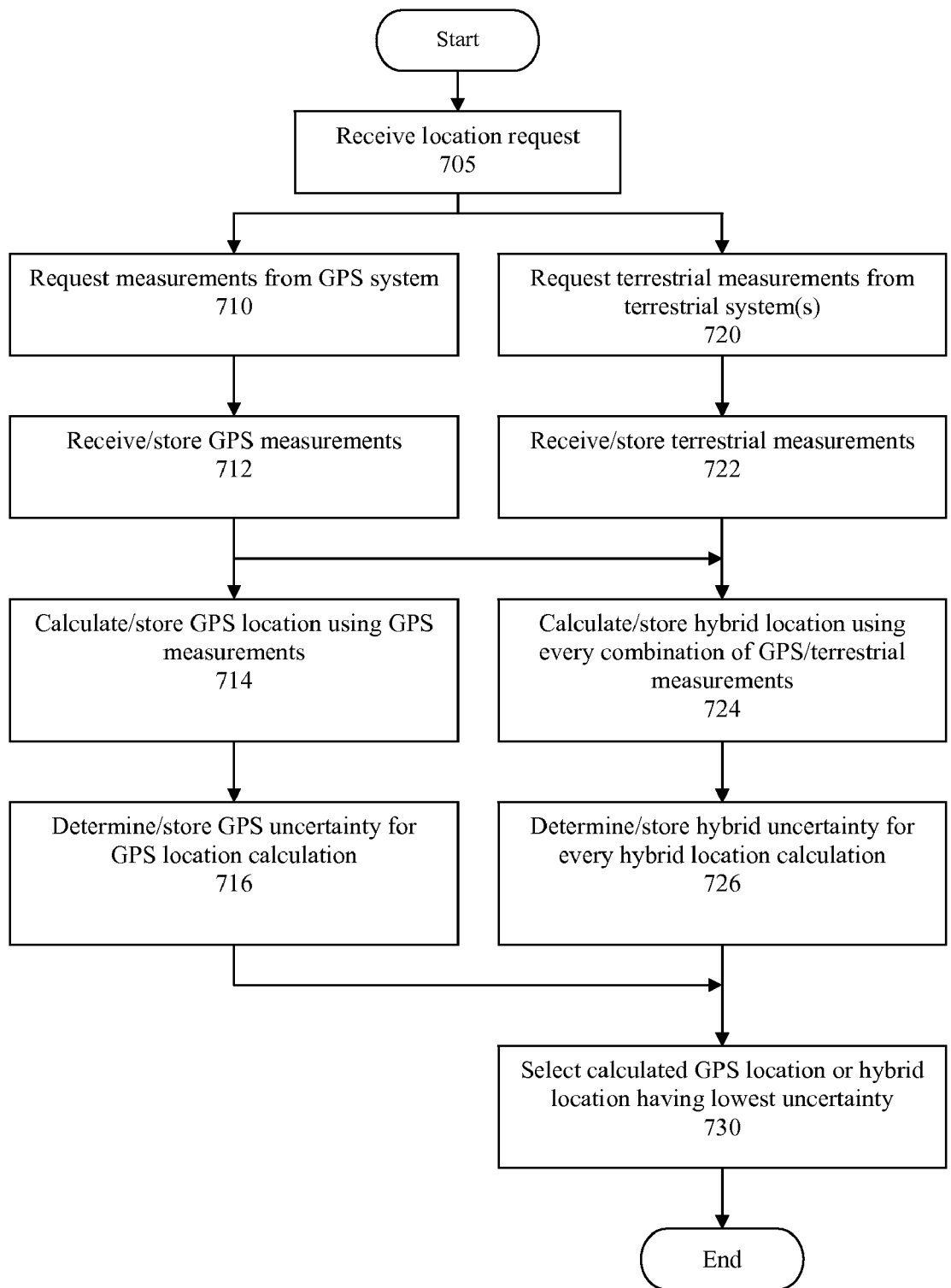
FIG. 7 is a flowchart illustrating a method for locating a mobile device in a wireless communication network, according to a representative embodiment.

FIG. 7 is a flow diagram illustrating a method for locating a mobile device in a wireless communication network, considering all terrestrial measurements in combination with GPS measurements.

Referring to FIG. 7, the MLC 120 receives a request at step 705 from the mobile device 130 over the wireless communication network 110 to determine the geographic location of the mobile device 130, as discussed above with respect to step 205 of FIG. 2. At steps 710 and 720, the MLC 120 requests location measurements from the mobile device 130 and devices in the wireless communication network 110, so that the MLC 120 is able to calculate the location of the mobile device 130 using a combination of different measurement systems, such as a GNSS positioning system and one or more terrestrial positioning systems. For purposes of explanation, it is assumed that the satellite positioning system of the GNSS network 140 is a GPS system, and that the wireless communication network 110 includes one terrestrial positioning system, which may be a U-TDOA system, for example. It is understood that other types of satellite and/or terrestrial systems may be incorporated without departing from the scope of the disclosure. It is further understood that the MLC 120 may request the location measurements consecutively, concurrently or substantially concurrently without departing from the scope of the disclosure.

Accordingly, in the representative embodiment, the MLC 120 requests the GPS measurements from the mobile device 130 and the terrestrial measurements from the LMUs 116-119 at steps 710 and 720, respectively. At steps 712 and 722, the MLC 120 receives and stores GPS measurements from the mobile device 130 and terrestrial measurements from the LMUs 116-119, e.g., via the LS 125. Further, the MLC 120 calculates and stores the location of the mobile device 130 using only the GPS measurements at step 714. At step 716, the MLC 120 determines and stores the uncertainty of the location calculated at step 716, using only GPS measurements. The uncertainty of the GPS calculated location may be expressed as an error ellipse (or other shape) at a given confidence level. An area of the error ellipse varies directly with respect to the given confidence level, such that a greater given confidence level results in a larger corresponding error ellipse.

Meanwhile, at step 724, the MLC 120 calculates and stores hybrid locations using every combination of terrestrial measurements with the GPS measurements. For example, when four terrestrial measurements are received from the LMUs 116-119, respectively, hybrid locations are calculated as a function of the GPS measurements combined with each one of the terrestrial measurements, as well as with every possible combination of two or more terrestrial measurements, including all terrestrial measurements.

The uncertainty of each location calculated at step 724 is determined at step 726, e.g., resulting in corresponding error ellipses at the same given confidence level used to determine the error ellipse of the GPS location calculation at step 716. At step 730, one of the calculated GPS location or calculated hybrid locations is selected as the location of the mobile device 130, based on the lowest corresponding uncertainty. In other words, the GPS location calculation or the one of the hybrid location calculations based on a combination of GPS and terrestrial measurements having the smallest error ellipse at the give confidence level is selected. In an embodiment, a location and corresponding error ellipse determined as a function of only the terrestrial measurement may also be calculated and compared to the GPS location calculation.

Each of the representative embodiments thus improves efficiency and accuracy in determining the geographic location of a mobile device, selectively using the best GPS and terrestrial measurements available, while disregarding the others.

Figure 8:
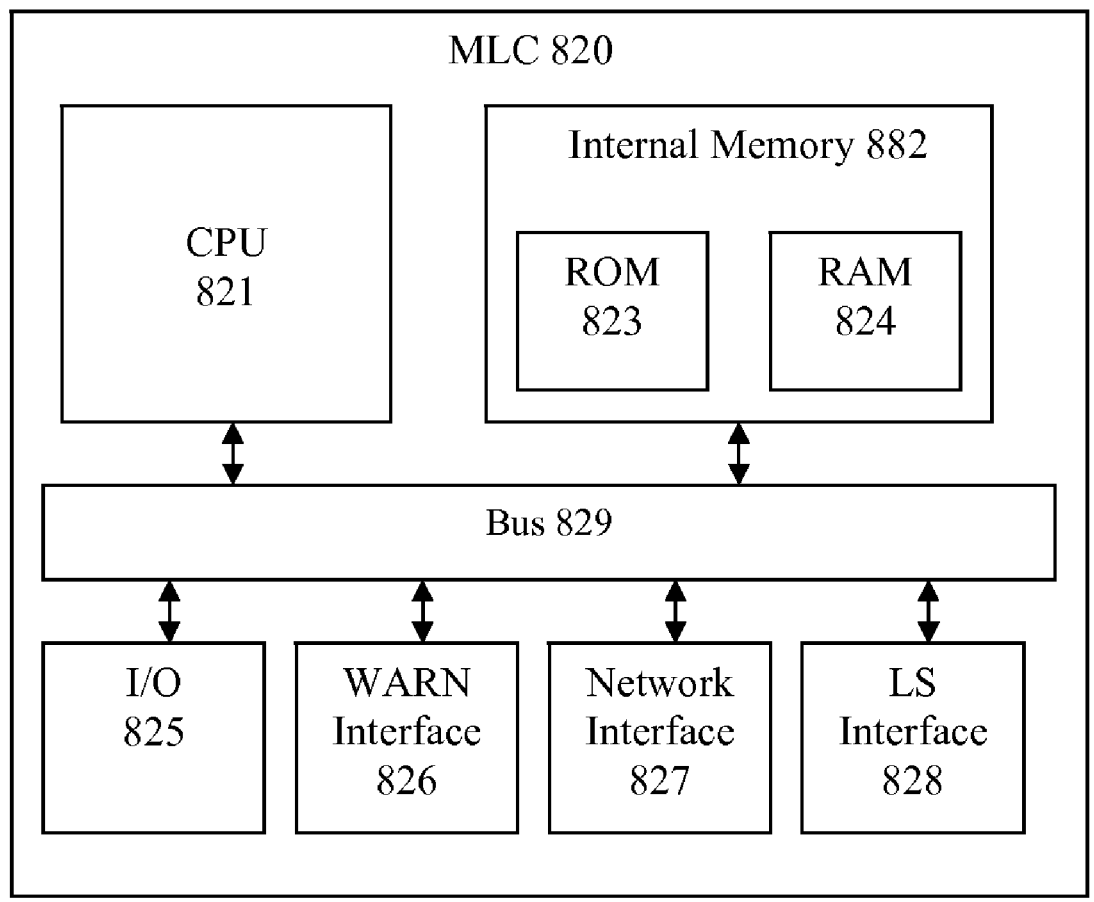
FIG. 8 is a functional block diagram illustrating a device for locating a mobile device in a wireless communication network, according to a representative embodiment.

FIG. 8 is a functional block diagram illustrating an MLC 820 for calculating locations of mobile devices in a wireless communication network, according to representative embodiments. Although the MLC 820 is shown and discussed in detail, it is understood that other servers in the system 100, such as the LS 125 in the wireless communication network 110, may be configured in a similar manner as the MLC 820, at least with respect to processing and storage functionality.

In the depicted embodiment, the MLC 820 includes central processing unit (CPU) 821, internal memory 822, bus 829 and various interfaces 825-828. The CPU 821 is configured to execute one or more software algorithms, including the mobile device location determination process and PCF of the embodiments described herein. In various embodiments, the CPU 821 may include its own memory (e.g., nonvolatile memory) for storing executable software code that allows it to perform various functions, including the location determination process. Alternatively, the executable code may be stored in designated memory locations within internal memory 822. The CPU 821 may execute an operating system, such as a Windows® operating system available from Microsoft Corporation, a Linux operating system, a Unix operating system (e.g., Solaris™ available from Sun Microsystems, Inc.), or a NetWare® operating system available from Novell, Inc.

The internal memory 822 includes at least nonvolatile read only memory (ROM) 823 and volatile random access memory (RAM) 824, although it is understood that internal memory 822 may be implemented as any number, type and combination of ROM and RAM, and may provide look-up tables and/or other relational functionality. In various embodiments, the internal memory 822 may include a disk drive or flash memory, for example. Further, the internal memory 822 may store program instructions and results of calculations or summaries performed by CPU 821.

In an embodiment, a user and/or other computers may interact with the MLC 820 using various input device(s) through I/O interface 825. The input devices may include a keyboard, a track ball, a mouse, a touch pad or touch-sensitive display, and the like. Also, information may be displayed on a display through a display interface (not shown), which may include any type of graphical user interface (GUI). For example, as a result of the location determination process, the geographic location of the mobile device 130 or an indication of failure, e.g., in the event that no calculation location meets predetermined accuracy criteria, may be visually displayed.

Other interfaces include the WARN interface 826, the network interface 827 and the ULS interface 828. The WARN interface 826 enables the MLC 820 to receive GPS information, such as navigation messages, from fixed GPS receivers 151 and 152, e.g., of the GNSS network 140. The network interface 827 enables data communications and control signaling between the MLC 820 and other network nodes, such as the base stations 111-114. The LS interface 828 enables the MLC 820 to communicate with the LS 125 and to receive U-TDOA measurements collected by the LS 125 from the LMUs 116-119, for example. The various interfaces may be a universal serial bus (USB) interface, an IEEE 1394 interface, or a parallel port interface, for example. As stated above, it will be understood that, although depicted separately, the MLC 820 may include the functionality of various entities with which it is depicted as interfacing, including the LS 125 and WARN 150, in various embodiments.

The various "parts" shown in the MLC 820 may be physically implemented using a software-controlled microprocessor, hard-wired logic circuits, or a combination thereof. Also, while the parts are functionally segregated in the MLC 820 for explanation purposes, they may be combined variously in any physical implementation.

Figure 9:
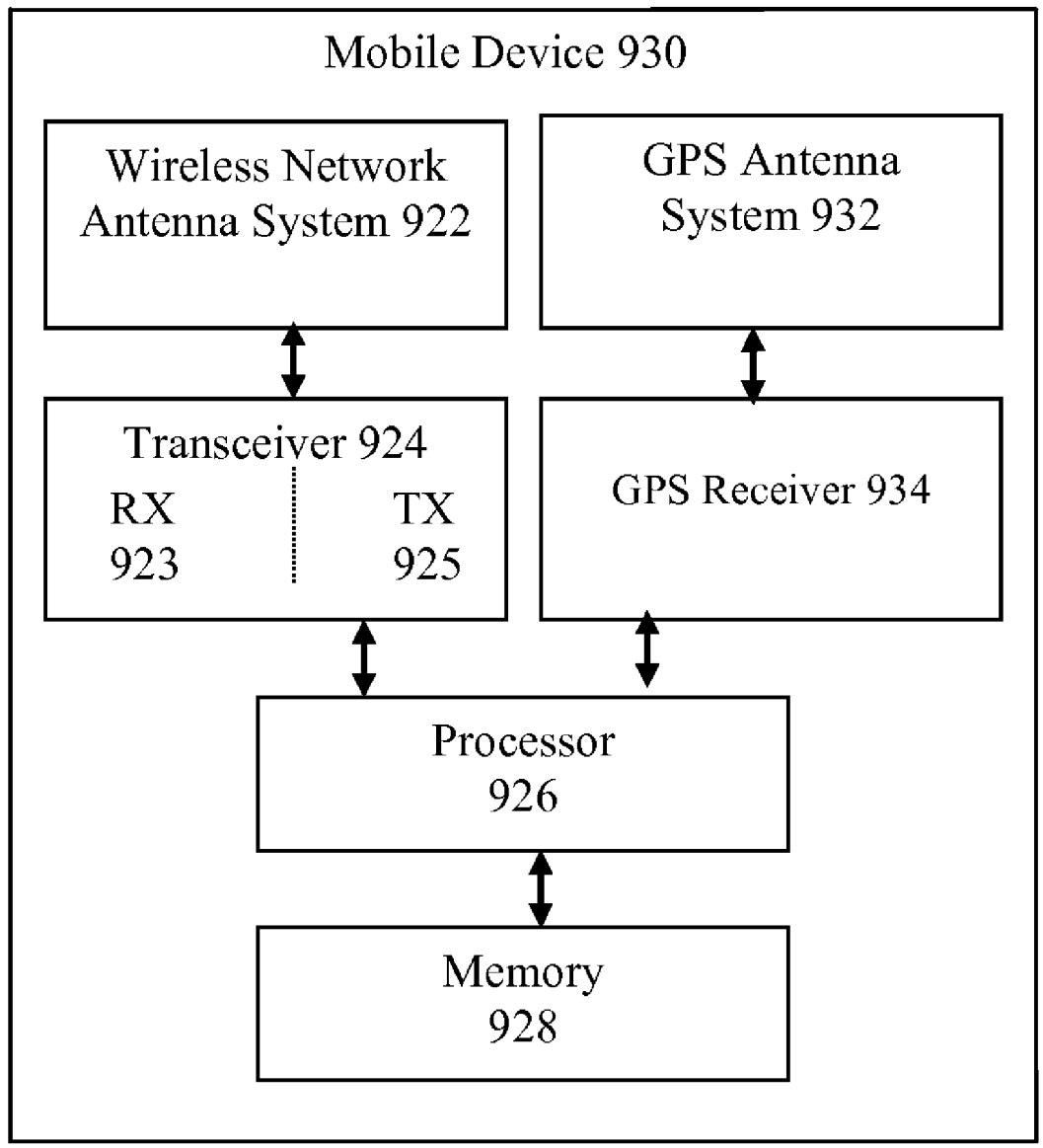
FIG. 9 is a functional block diagram illustrating a mobile device in a wireless communication network, according to a representative embodiment.

FIG. 9 is a functional block diagram of representative mobile device 930, configured to communicate with an MLC (e.g., MLC 120 of FIG. 1 or MLC 820 of FIG. 8), over a wireless communication network, according to various embodiments. The mobile device 930 includes transceiver 924, antenna system 922, GPS receiver 934, GPS antenna system 932, processor 926 and memory 928.

The transceiver 924 includes a receiver 923 and a transmitter 925, and provides functionality for the mobile device 930 to communicate with base stations in the wireless communication network (e.g., base stations 111-114), according to appropriate standard protocols, such UMTS, GSM, CDMA, WiFi, WiMax, DTV, and the like. The transceiver 924 sends and received voice/data and control signals through the antenna system 922, which may include an omni-directional antenna, a steerable antenna, an antenna array or other compatible antenna. The GPS receiver 934 receives positioning signals from GPS satellites (e.g., satellites 141-144), including navigation messages providing ephemeris data and timing signals. The GPS receiver 934 receives GPS positioning signals through the GPS antenna system 932, which may be a stub antenna, for example.

The processor 926 is configured to execute one or more software algorithms, including the location determination algorithm of the embodiments described herein, in conjunction with memory 928 to provide the functionality of mobile device 930. The processor 926 may include its own memory (e.g., nonvolatile memory) for storing executable software code that allows it to perform the various functions of the mobile device 930, discussed herein. Alternatively, the executable code may be stored in designated memory locations within memory 928. The processor 926 may also provide a clock for determining timing for the mobile device 930. In an embodiment, the processor 926 is configured to derive GPS measurements from received GPS ranging signals. The GPS measurements may then be forwarded to an MLC (e.g., MLC 120, MLC 820) through the transmitter 925 over a wireless communication network (e.g., wireless communication network 110). Also, in another embodiment, the processor 926 may calculate the location of the mobile device 930 using the GPS measurements, and forward the calculated GPS location to the MLC 120.

The various "parts" shown in the mobile device 930 may be physically implemented using a software-controlled microprocessor, hard-wired logic circuits, or a combination thereof. Also, while the parts are functionally segregated in the mobile device 930 for explanation purposes, they may be combined variously in any physical implementation.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A method of determining a location of a mobile device in a wireless network, the method comprising:
receiving a plurality of global navigation satellite system (GNSS) measurements for the mobile device;
receiving a plurality of terrestrial measurements from a corresponding plurality of transceivers in the wireless network, each terrestrial measurement indicating a distance between the corresponding transceiver and the mobile device;

determining a first dilution of precision (DOP) measure corresponding to the received GNSS measurements;
determining combined DOP measures corresponding to each terrestrial measurement combined with the GNSS measurements;
selecting at least one terrestrial measurement resulting in a corresponding combined DOP measure that is improved over the first DOP measure; and
determining the location of the mobile device as a function of the GNSS measurements and the selected at least one terrestrial measurement.

2. The method of claim 1, wherein the selected at least one terrestrial measurement includes all terrestrial measurements resulting in corresponding combined DOP measures less than the first DOP measure.

3. The method of claim 1, wherein the GNSS measurements comprise measurements from one of a global positioning system (GPS), a Global Navigation Satellite System (GLONASS), Galileo system or a COMPASS Navigation Satellite System (BeiDou).

4. The method of claim 1, wherein the plurality of terrestrial measurements comprise at least one of uplink-time difference of arrival (U-TDOA) measurements, timing advance (TA) measurements, round-trip time (RTT) measurements, enhanced observed time difference (E-OTD) measurements, angle of arrival (AoA) measurements, power of arrival (POA) measurements, WiFi measurements, and DTV signals.

5. The method of claim 1, further comprising:
disregarding at least one terrestrial measurement resulting in a corresponding combined DOP measure that is not improved over the first DOP measure.

6. The method of claim 5, wherein the disregarded at least one terrestrial measurement includes all terrestrial measurements resulting in corresponding combined DOP measures greater than the first DOP measure.

7. The method of claim 1, further comprising:
determining a first measurement error corresponding to the received GNSS measurements;
determining combined measurement errors corresponding to each terrestrial measurement combined with the GNSS measurements; and
selecting at least one terrestrial measurement resulting in a corresponding combined measurement error that is improved over the first measurement error, in addition to a corresponding combined DOP measure that is improved over the first DOP measure.

8. The method of claim 7, wherein the first measurement error and the combined measurement errors result from at least one of ionosphere error, troposphere error and multipath effects.

9. A method of determining a location of a mobile device in a wireless network, the method comprising:
receiving at least one global navigation satellite system (GNSS) measurement for the mobile device;
receiving at least one terrestrial measurement from a corresponding at least one transceiver in the wireless network, the at least one terrestrial measurement indicating a distance between the corresponding transceiver and the mobile device;
determining a GNSS dilution of precision (DOP) measure corresponding to the received at least one GNSS measurement;
determining a combined DOP measure corresponding to the at least one terrestrial measurement combined with the at least one GNSS measurement;
comparing the combined DOP measure with the GNSS DOP measure; and
determining the location of the mobile device as a function of the at least one GNSS measurement and the at least one terrestrial measurement when the combined DOP measure is improved over the GNSS DOP measure.

10. The method of claim 9, further comprising:
determining the location of the mobile device as a function of the at least one GNSS measurement, and not the at least one terrestrial measurement, when the combined DOP measure is not improved over the GNSS DOP measure.

11. The method of claim 10, wherein the at least one GNSS measurement comprises measurements from one of a global positioning system (GPS), a Global Navigation Satellite System (GLONASS), Galileo system or a COMPASS Navigation Satellite System (BeiDou).

12. The method of claim 11, wherein the at least one terrestrial measurement comprises uplink-time difference of arrival (U-TDOA) measurements, timing advance (TA) measurements, round-trip time (RTT) measurements, enhanced observed time difference (E-OTD) measurements, angle of arrival (AoA) measurements, power of arrival (POA) measurements, WiFi measurements, or DTV signals.

13. The method of claim 9, further comprising:
receiving at least one additional terrestrial measurement;
determining a revised combined DOP measure corresponding to the at least one additional terrestrial measurement combined with the at least one terrestrial measurement and the at least one GNSS measurement;
comparing the revised combined DOP measure with the combined DOP measure; and
determining the location of the mobile device as a function of the at least one GNSS measurement, the at least one terrestrial measurement and the at least one additional terrestrial measurement when the revised combined DOP measure is improved over the combined DOP measure.

14. A tangible computer readable medium storing a program, executable by a computer, for determining a location of a mobile device in a wireless network, the computer readable medium comprising:
first receiving code for receiving at least one global navigation satellite system (GNSS) measurement for the mobile device;
second receiving code for receiving at least one terrestrial measurement from a corresponding at least one transceiver in the wireless network, the at least one terrestrial measurement indicating a distance between the corresponding transceiver and the mobile device;
GNSS dilution of precision (DOP) code for determining a GNSS DOP measure corresponding to the received at least one GNSS measurement;
combined DOP code for determining a combined DOP measure corresponding to the at least one terrestrial measurement combined with the at least one GNSS measurement;
comparing code for comparing the combined DOP measure with the GNSS DOP measure; and
determining code for determining the location of the mobile device as a function of the at least one GNSS measurement and the at least one terrestrial measurement when the combined DOP measure is improved over the GNSS DOP measure.

15. The tangible computer readable medium of claim 14, wherein the determining code determines the location of the mobile device as a function of the at least one GNSS measurement, and not the at least one terrestrial measurement, when the combined DOP measure is not improved over the GNSS DOP measure.

16. The tangible computer readable medium of claim 15, wherein the combined DOP measure is improved over the GNSS DOP measure when combined DOP measure is less than the GNSS DOP measure.

17. The tangible computer readable medium of claim 14, further comprising:
  GNSS error code for determining a GNSS measurement error corresponding to the received at least one GNSS measurement;
  combined error code for determining a combined measurement error corresponding to the at least one terrestrial measurement combined with the at least one GNSS measurement; and
  error comparing code for comparing the combined measurement error with the GNSS DOP measurement error; and
  the determining code for further determining the location of the mobile device as a function of the at least one GNSS measurement and the at least one terrestrial measurement when the combined measurement error, as well as the combined DOP measure, is improved over the GNSS measurement error.

18. The tangible computer readable medium of claim 17, wherein the combined measurement error is improved over the GNSS measurement error when the combined measurement error is less than the GNSS measurement error.

19. The tangible computer readable medium of claim 17, wherein the determining code determines the location of the mobile device as a function of the at least one GNSS measurement, and not the at least one terrestrial measurement, when the combined measurement error is not improved over the GNSS measurement error, regardless of whether the combined DOP measure is improved over the GNSS DOP measure.

20. A tangible computer readable medium storing a program, executable by a computer, for determining a location of a mobile device in a wireless network, the computer readable medium comprising:
  first receiving code for receiving a plurality of global navigation satellite system (GNSS) measurements for the mobile device;
  second receiving code for receiving a plurality of terrestrial measurements from a corresponding plurality of transceivers in the wireless network, each terrestrial measurement indicating a distance between the corresponding transceiver and the mobile device;
  dilution of precision (DOP) code for a determining a GNSS DOP measure corresponding to the received GNSS measurements, and for determining combined DOP measures corresponding to each terrestrial measurement combined with the GNSS measurements;
  selecting code for selecting at least one terrestrial measurement resulting in a corresponding combined DOP measure that is improved over the first DOP measure; and
  determining code for determining the location of the mobile device as a function of the GNSS measurements and the selected at least one terrestrial measurement.

* * * * *